United States Patent
Harada et al.

(10) Patent No.: US 9,601,769 B2
(45) Date of Patent: Mar. 21, 2017

(54) ACTIVE MATERIAL, NONAQUEOUS ELECTROLYTE BATTERY, AND BATTERY PACK

(71) Applicant: KABUSHIKI KAISHA TOSHIBA, Tokyo (JP)

(72) Inventors: Yasuhiro Harada, Kanagawa (JP); Norio Takami, Kanagawa (JP); Yorikazu Yoshida, Kanagawa (JP); Kazuki Ise, Tokyo (JP); Kazuomi Yoshima, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 65 days.

(21) Appl. No.: 14/660,325

(22) Filed: Mar. 17, 2015

(65) Prior Publication Data
US 2015/0270542 A1 Sep. 24, 2015

Related U.S. Application Data

(63) Continuation of application No. PCT/JP2014/057393, filed on Mar. 18, 2014.

(51) Int. Cl.
*H01M 4/485* (2010.01)
*H01M 10/42* (2006.01)
(Continued)

(52) U.S. Cl.
CPC .......... *H01M 4/485* (2013.01); *C01G 39/006* (2013.01); *H01M 10/4257* (2013.01);
(Continued)

(58) Field of Classification Search
CPC ............... H01M 4/485; H01M 10/052; H01M 10/4257; H01M 10/0525; H01M 2004/027; H01M 2220/20; H01M 2220/30; Y02E 60/122
IPC ........... H01M 4/485,10/052, 10/4257, 10/0525, 2004/027, 2220/20, 2220/30; Y02E 60/122
See application file for complete search history.

(56) References Cited

U.S. PATENT DOCUMENTS

2012/0107692 A1  5/2012  Harada et al.
2012/0244442 A1  9/2012  Harada et al.
2014/0295282 A1* 10/2014  Harada .................. H01M 4/485
                                                     429/231.2

FOREIGN PATENT DOCUMENTS

CN   102544466 A   7/2012
CN   102694160 A   9/2012
(Continued)

OTHER PUBLICATIONS

Korean Office Action issued Jun. 20, 2016 in Patent Application No. 10-2015-7004262 (with English translation).
(Continued)

*Primary Examiner* — Laura Weiner
(74) *Attorney, Agent, or Firm* — Oblon, McClelland, Maier & Neustadt, L.L.P.

(57) ABSTRACT

According to one embodiment, there is provided an active material. The active material contains a composite oxide represented by a following general formula:

the general formula: $Li_x(Nb_{1-y}Ta_y)_{2-z}Ti_{1+0.5z}M_{0.5z}O_7$, in which $0 \leq x \leq 5$, $0 \leq y \leq 1$, and $0 < z \leq 1$, and M is at least one metal element selected from the group consisting of Mo and W.

11 Claims, 6 Drawing Sheets

(51) Int. Cl.
  *C01G 39/00*    (2006.01)
  *H01M 10/052*   (2010.01)
  *H01M 4/02*     (2006.01)
  *H01M 2/34*     (2006.01)
  *H01M 4/131*    (2010.01)
  *H01M 4/1391*   (2010.01)
  *H01M 4/36*     (2006.01)
  *H01M 4/587*    (2010.01)
  *H01M 4/62*     (2006.01)
  *H01M 10/0525*  (2010.01)
  *H01M 10/48*    (2006.01)

(52) U.S. Cl.
  CPC ...... *C01P 2002/77* (2013.01); *C01P 2006/12* (2013.01); *C01P 2006/40* (2013.01); *H01M 2/348* (2013.01); *H01M 4/131* (2013.01); *H01M 4/1391* (2013.01); *H01M 4/366* (2013.01); *H01M 4/587* (2013.01); *H01M 4/625* (2013.01); *H01M 10/052* (2013.01); *H01M 10/0525* (2013.01); *H01M 10/425* (2013.01); *H01M 10/486* (2013.01); *H01M 2004/027* (2013.01); *H01M 2200/10* (2013.01); *H01M 2220/20* (2013.01); *H01M 2220/30* (2013.01); *Y02E 60/122* (2013.01); *Y02T 10/7011* (2013.01)

(56) References Cited

FOREIGN PATENT DOCUMENTS

| CN | 103081187 A  | 5/2013  |
|----|--------------|---------|
| CN | 104078665 A  | 10/2014 |
| JP | 58-220361    | 12/1983 |
| JP | 2005-135872  | 5/2005  |
| JP | 2009-021102  | 1/2009  |
| JP | 2010-287496  | 12/2010 |
| JP | 2012-099287  | 5/2012  |
| JP | 2012-199146  | 10/2012 |

OTHER PUBLICATIONS

English translation of the International Search Report issued on May 13, 2014 in PCT/JP2014/057393.
International Search Report issued in International Application No. PCT/JP2014/057393, dated May 13, 2014.
Combined Office Action and Search Report issued Nov. 2, 2016 in Chinese Patent Application No. 201480002189.6 (with English translation of category of cited documents).

* cited by examiner

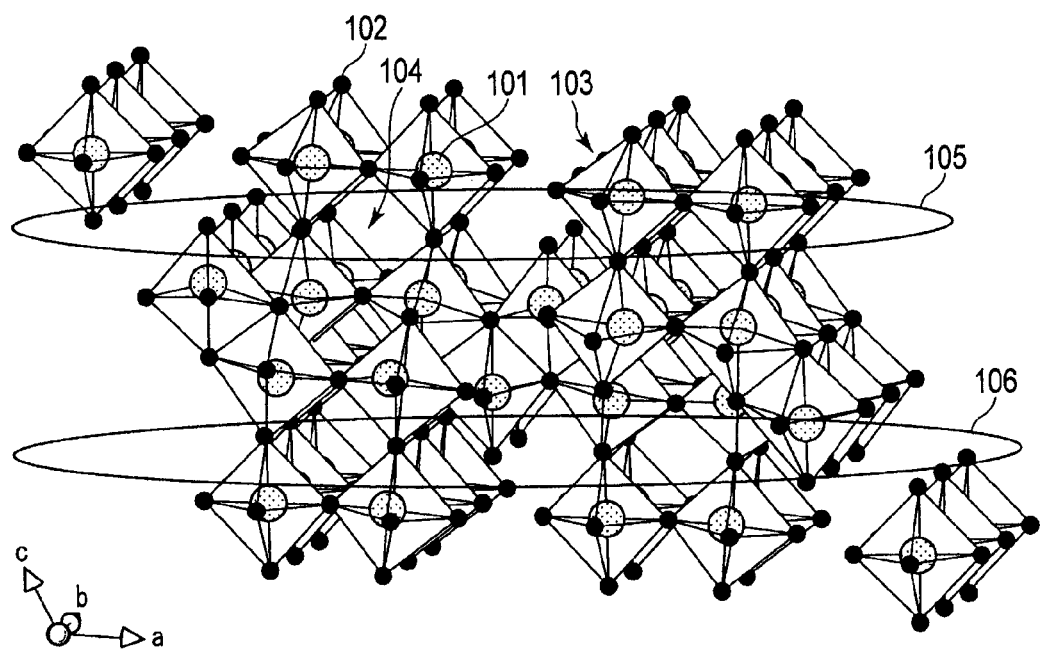
F I G. 1
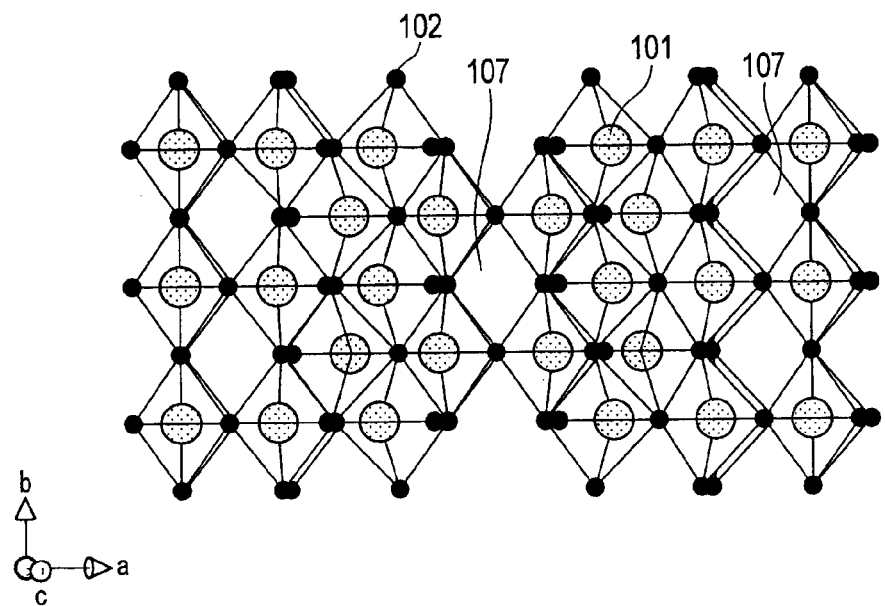
F I G. 2

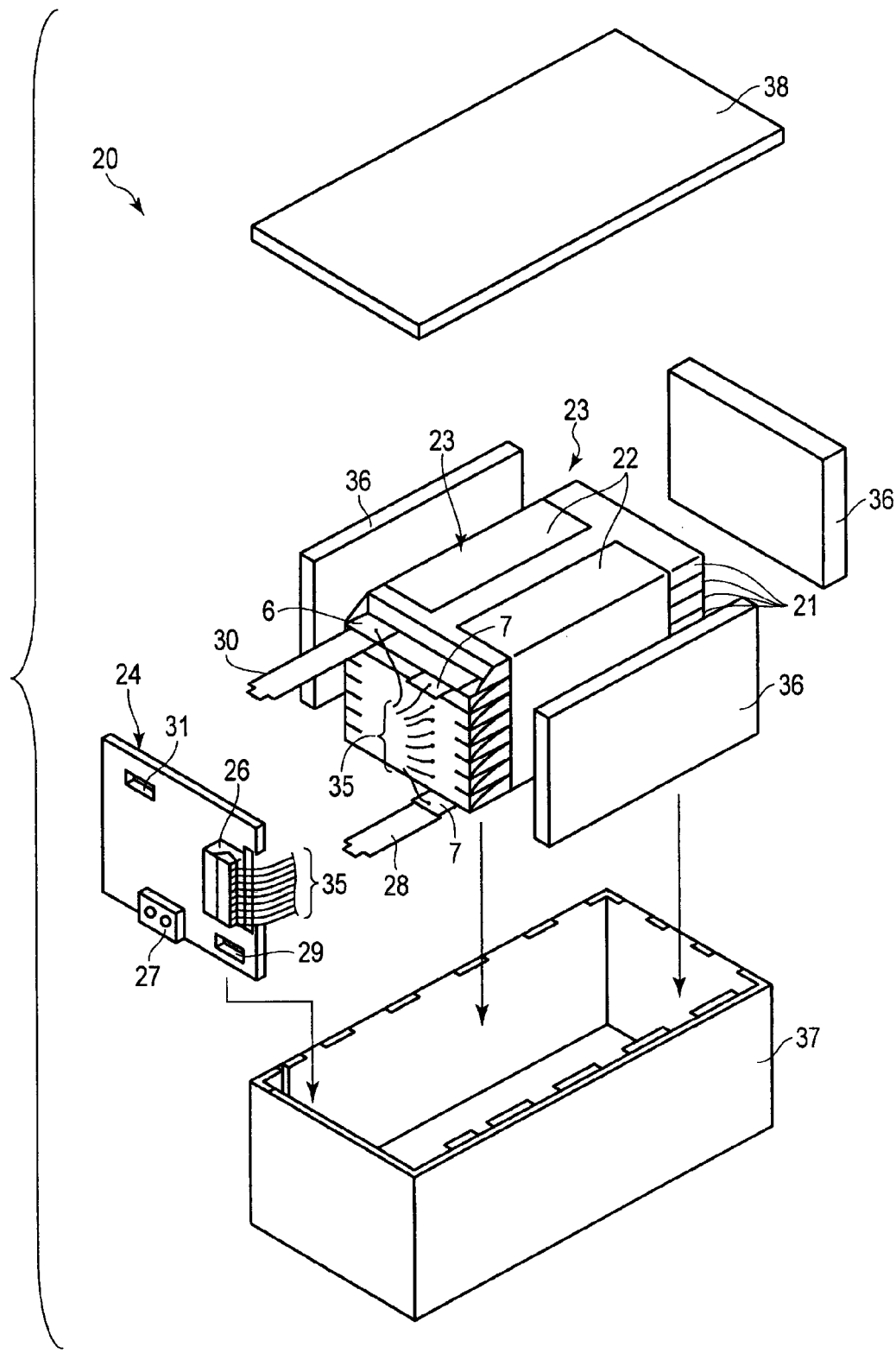
F I G. 7

ACTIVE MATERIAL, NONAQUEOUS ELECTROLYTE BATTERY, AND BATTERY PACK

CROSS-REFERENCE TO RELATED APPLICATIONS

This application is a Continuation application of PCT Application No. PCT/JP2014/057393, filed Mar. 18, 2014, the entire contents of which are incorporated herein by reference.

FIELD

Embodiments described herein relate generally to an active material, a nonaqueous electrolyte battery, and a battery pack.

BACKGROUND

Recently, a nonaqueous electrolyte secondary battery such as a lithium-ion secondary battery has been actively researched and developed as a battery having high-energy density. The nonaqueous electrolyte battery is expected to be used as a power source for hybrid vehicles, electric cars, an uninterruptible power supply for base stations for portable telephone, or the like. For this, the nonaqueous electrolyte battery is desired to have other characteristics such as rapid charge-and-discharge characteristics and long-term reliability. For example, a nonaqueous electrolyte battery enabling rapid charge and discharge not only remarkably shortens the charging time but also makes it possible to improve performances of the motive force of a hybrid vehicle or the like and to efficiently recover the regenerative energy.

In order to enable rapid charge and discharge, it is necessary that electrons and lithium ions can migrate rapidly between a positive electrode and a negative electrode.

It is also important that rapid charge and discharge can be safely performed. For example, when a battery using a carbon-based negative electrode repeats rapid charge and discharge, dendrite precipitation of metal lithium occurs on the electrode. There is fear in which the dendrite precipitation leads to internal short circuits, which causes heat generation and fires.

In light of this, a battery using a metal composite oxide in place of a carbonaceous material in a negative electrode has been developed. Particularly, in a battery using a titanium oxide as a negative electrode, rapid charge and discharge can be stably performed. Such a battery also has a longer life than that of the carbon-based negative electrode.

However, the titanium oxide has a higher (nobler) potential relative to metal lithium than that of the carbonaceous material. Further, the titanium oxide has a lower capacity per mass. Thus, the battery using the titanium oxide in the negative electrode has a problem that the energy density is lower.

For example, the potential of the electrode using the titanium oxide is about 1.5 V based on metal lithium, and is higher (nobler) than that of the carbon-based negative electrode. The potential of the titanium oxide is due to the oxidation-reduction reaction between $Ti^{3+}$ and $Ti^{4+}$ when lithium is electrochemically absorbed and released, and is therefore limited electrochemically. Furthermore, there is a fact that the rapid charge and discharge of lithium ions can be stably performed at an electrode potential as high as about 1.5 V in the electrode using the titanium oxide. It is therefore substantially difficult to drop the potential of the electrode to improve the energy density.

The other hand, as to the capacity of the battery per unit mass, the theoretical capacity of titanium dioxide having an anatase structure is about 165 mAh/g, and the theoretical capacity of a lithium-titanium composite oxide such as $Li_4Ti_5O_{12}$ is also about 180 mAh/g. By contrast, the theoretical capacity of a general graphite-based electrode material is 385 mAh/g or more. Thus, the capacity density of the titanium oxide is significantly lower than that of the carbon-based negative electrode. This is due to a reduction in a substantial capacity because there are only a small number of equivalent lithium-absorbing sites in the crystal structure of the titanium oxide, and lithium is easily stabilized in the structure.

BRIEF DESCRIPTION OF THE DRAWINGS

FIG. 1 is a typical view showing the crystal structure of monoclinic $Nb_{1.9}Ti_{1.05}Mo_{0.05}O_7$.

FIG. 2 is a typical view of the crystal structure of FIG. 1 as viewed from other direction.

FIG. 7 is an exploded perspective view of a battery pack as an example according to a third embodiment.

DETAILED DESCRIPTION

Figure 3:
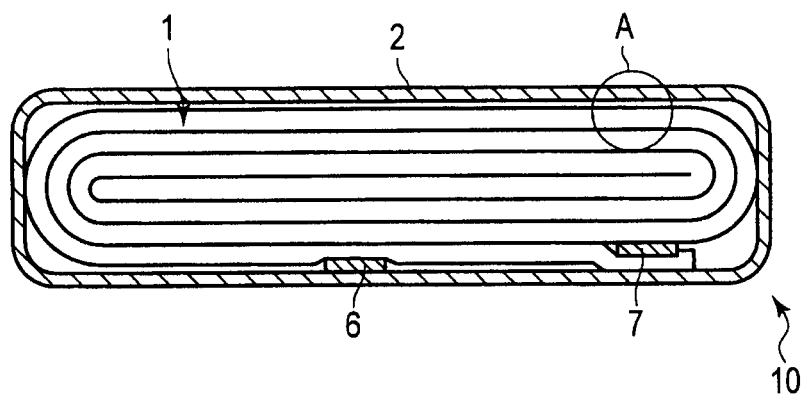
FIG. 3 is a schematic sectional view of a nonaqueous electrolyte battery as an example according to a second embodiment.

In general, according to one embodiment, there is provided an active material. The active material contains a composite oxide represented by a following general formula:

the general formula: $Li_x(Nb_{1-y}Ta_y)_{2-z}Ti_{1+0.5z}M_{0.5z}O_7$, in which $0 \leq x \leq 5$, $0 \leq y \leq 1$, and $0 < z \leq 1$, and M is at least one metal element selected from the group consisting of Mo and W.

Hereinafter, the embodiments will be described with reference to the drawings. It should be noted that the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be appropriately changed taking the following explanations and known technologies into consideration.

First Embodiment

According to a first embodiment, there is provided an active material. The active material contains a composite oxide represented by a following general formula:

the general formula: $Li_x(Nb_{1-y}Ta_y)_{2-z}Ti_{1+0.5z}M_{0.5z}O_7$, in which $0 \leq x \leq 5$, $0 \leq y \leq 1$, and $0 < z \leq 1$, and M is at least one metal element selected from the group consisting of Mo and W.

The composite oxide represented by the general formula $Li_x(Nb_{1-y}Ta_y)_{2-z}Ti_{1+0.5z}M_{0.5z}O_7$ can have a monoclinic crystal structure.

As an example of the composite oxide represented by the general formula $Li_x(Nb_{1-y}Ta_y)_{2-z}Ti_{1+0.5z}M_{0.5z}O_7$, schematic views of the crystal structure of a monoclinic composite oxide $Nb_{1.9}Ti_{1.05}Mo_{0.05}O_7$ are shown in FIGS. 1 and 2.

As shown in FIG. 1, in the crystal structure of the monoclinic composite oxide $Nb_{1.9}Ti_{1.05}Mo_{0.05}O_7$, a metal ion 101 and an oxide ion 102 form a skeleton structure part 103. As the metal ion 101, Nb ions, Ti ions, and Mo ions are arranged at random in the following ratio; Nb:Ti:No=1.9: 1.05:0.05. The skeleton structure parts 103 are alternately arranged three-dimensionally, thereby voids 104 are formed among the skeleton structure parts 103. This void 104 is able to serve as a host for lithium ions. The void 104 can occupy a large portion of the whole crystal structure as shown in FIG. 1. Moreover, the void 104 can stably maintain the structure even if the lithium ions are absorbed.

When the lithium ions are absorbed into the void 104, the metal ion 101 constituting the skeleton is reduced to a trivalent one, thereby maintaining electric neutrality of a crystal. In the monoclinic composite oxide $Nb_{1.9}Ti_{1.05}Mo_{0.05}O_7$ having the crystal structure shown in FIGS. 1 and 2, not only is a Ti ion which is a tetravalent cation reduced to a trivalent cation but also a Nb ion which is a pentavalent cation reduced to a trivalent cation. For this, the reduction number of the monoclinic composite oxide $Nb_{1.9}Ti_{1.05}Mo_{0.05}O_7$ per weight of active material is larger than that of a compound only containing a Ti ion which is a tetravalent cation. As a result, the monoclinic composite oxide $Nb_{1.9}Ti_{1.05}Mo_{0.05}O_7$ can maintain electric neutrality of a crystal even if more lithium ions are absorbed. Thus, since more lithium ions can be absorbed, the monoclinic composite oxide $Nb_{1.9}Ti_{1.05}Mo_{0.05}O_7$ can be more improved in an energy density than a compound such as titanium oxide only containing a tetravalent cation.

The monoclinic composite oxide $Nb_{1.9}Ti_{1.05}Mo_{0.05}O_7$ having the crystal structure shown in FIGS. 1 and 2 has a plurality of areas having two-dimensional channels enabling rapid diffusion of lithium ions and conductive paths connecting these areas to each other. Specifically, in FIG. 1, areas 105 and 106 are parts each of which has two-dimensional channels in a [100] direction and a [010] direction. In the crystal structure of the monoclinic composite oxide $Nb_{1.9}Ti_{1.05}Mo_{0.05}O_7$, as shown in FIG. 2 respectively, voids 107 exist in a [001] direction. The void 107 has a tunnel structure advantageous to conduction of the lithium ions. The void 107 connects the area 105 with the area 106, and serves as the conductive path of the lithium ions in the [001] direction. Due to the existence of the conductive path, the lithium ions can go back-and-forth between the areas 105 and 106.

Thus, the crystal structure of the monoclinic composite oxide $Nb_{1.9}Ti_{1.05}Mo_{0.05}O_7$ has a large space into which lithium ions can be equivalently absorbed, and has a structural stability. Moreover, the monoclinic composite oxide $Nb_{1.9}Ti_{1.05}Mo_{0.05}O_7$ can be more improved in an energy density than a compound containing no pentavalent cation. Furthermore, since the crystal structure of the monoclinic composite oxide $Nb_{1.9}Ti_{1.05}Mo_{0.05}O_7$ has the area 105 and the area 106 having two-dimensional channels enabling rapid diffusion of lithium ions, and the conductive path 107 connecting these areas to each other in the [001] direction, the monoclinic composite oxide can improve the absorption properties of the lithium ions to the absorption space and the release properties of the lithium ions from the absorption space, and can effectively increase a space contributing to the absorption and desorption of the lithium ions. From these results, the monoclinic composite oxide $Nb_{1.9}Ti_{1.05}Mo_{0.05}O_7$ can provide a high capacity.

Furthermore, the composite oxide represented by the general formula $Li_x(Nb_{1-y}Ta_y)_{2-z}Ti_{1+0.5z}M_{0.5z}O_7$ ($0 \leq x \leq 5$, $0 \leq y \leq 1$, and $0 < z \leq 1$, and M is at least one metal element selected from the group consisting of Mo and W) can have the same crystal structure as that of the monoclinic composite oxide $Nb_{1.9}Ti_{1.05}Mo_{0.05}O_7$ shown in FIGS. 1 and 2, for the reason which will be described below.

First, in the general formula $Li_x(Nb_{1-y}Ta_y)_{2-z}Ti_{1+0.5z}M_{0.5z}O_7$, a subscript x represents an amount of lithium absorbed by the composite oxide represented by the general formula. As described above, the absorption sites of lithium in the crystal structure of the monoclinic composite oxide $Nb_{1.9}Ti_{1.05}Mo_{0.05}O_7$ can stably maintain the structure. Therefore, the composite oxide represented by the general formula $Li_x(Nb_{1-y}Ta_y)_{2-z}Ti_{1+0.5z}Mo_{0.5z}O_7$ can maintain the same crystal structure irrespective of the value of the subscript x.

Next, niobium Nb and tantalum Ta are elements having chemical properties and physical properties close to each other. Therefore, even if Nb is partially or wholly substituted with Ta in the crystal structure of the monoclinic composite oxide $Nb_{1.9}Ti_{1.05}Mo_{0.05}O_7$, the crystal structure of the oxide after being substituted is the same as the crystal structure of the monoclinic composite oxide $Nb_{1.9}Ti_{1.05}Mo_{0.05}O_7$. Therefore, the composite oxide represented by the general formula $Li_x(Nb_{1-y}Ta_y)_{2-z}Ti_{1+0.5z}M_{0.5z}O_7$ can have the same crystal structure irrespective of the value of a subscript y.

Next, the composite oxide represented by the general formula $Li_x(Nb_{1-y}Ta_y)_{2-z}Ti_{1+0.5z}M_{0.5z}O_7$ can maintain the structure shown in FIGS. 1 and 2 irrespective of the kind of a metal element M when z is 1 or less. This is because when z is 1 or less, Nb and/or Ta, Ti, and the metal element M are easily arranged at random in a crystal lattice, and the skeleton structure can be maintained. On the other hand, when z is more than 1, a different crystal structure tends to be easily stabilized.

Thus, since the composite oxide represented by the general formula $Li_x(Nb_{1-y}Ta_y)_{2-z}Ti_{1+0.5z}M_{0.5z}O_7$ has the same or similar crystal structure as the crystal structure shown in FIGS. 1 and 2, the composite oxide can provide a high capacity. Specifically, the theoretical capacity of the composite oxide represented by the general formula $Li_x(Nb_{1-y}Ta_y)_{2-z}Ti_{1+0.5z}M_{0.5z}O_7$ is 300 mAh/g or more. The value is equal to or greater than 1.5 times the theoretical capacity of titanium oxide having a spinel structure.

Also, the active material according to the first embodiment containing the composite oxide represented by the general formula $Li_x(Nb_{1-y}Ta_y)_{2-z}Ti_{1+0.5z}M_{0.5z}O_7$ can achieve a nonaqueous electrolyte battery capable of exhibiting excellent repeated charge-and-discharge characteristics and excellent rapid charge-and-discharge performance as compared with the case where a composite oxide containing no metal M, specifically, a composite oxide represented by the general formula $Li_x(Nb_{1-y}Ta_y)_2TiO_7$ is used. The reason will be described below.

A composite oxide represented by the general formula $Li_xNb_{2-z}Ti_{1+0.5z}M_{0.5z}O_7$ is a substitutional solid solution in which z mol of niobium is substituted with z/2 mol of titanium and z/2 mol of a metal element M in a monoclinic composite oxide $Li_xNb_2TiO_7$. Here, a Ti ion is tetravalent; a Nb ion is pentavalent; and an ion of the metal element M is hexavalent. In the substitution, by substituting z mol of niobium enabling two-electron reduction with z/2 mol of titanium enabling one-electron reduction, the hexavalent cation M can be substitutionally solid-solubilized without reducing the number of electrons capable of being reduced in a unit lattice.

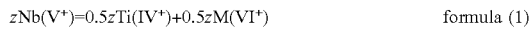

$$zNb(V^+) = 0.5zTi(IV^+) + 0.5zM(VI^+) \quad \text{formula (1)}$$

Owing to the fact that a part of niobium is substituted with titanium in the composite oxide represented by the general formula $Li_xNb_{2-z}Ti_{1+0.5z}M_{0.5z}O_7$, the composite oxide can exhibit a charge-and-discharge curve having a larger plateau area at about 1.55 V caused by the oxidation-reduction of titanium than that of the composite oxide represented by the general formula $Li_xNb_2TiO_7$.

The active material according to the first embodiment containing the composite oxide represented by the general formula $Li_xNb_{2-z}Ti_{1+0.5z}M_{0.5z}O_7$ has the following advantage by virtue of the fact that the active material can exhibit the charge-and-discharge curve having a large plateau area at about 1.55 V (vs. Li/Li$^+$).

First, a potential area at which tetravalent cation is reduced to trivalent one in the reduction potential of niobium which is a pentavalent cation is lower than the reduction potential of titanium, i.e., 1.55 V. Therefore, in order to completely utilize the reduction of niobium in a negative electrode containing the composite oxide represented by the general formula $Li_xNb_2TiO_7$, it is necessary to lower a negative electrode potential to about 1.0 V (vs. Li/Li$^+$). However, the reductive decomposition of an electrolytic solution is easily generated in the potential area, which may decrease the repeated charge-and-discharge characteristics.

On the other hand, since the active material according to the first embodiment exhibit a charge-and-discharge curve having a larger plateau area at about 1.55 V (vs. Li/Li$^+$), a capacity area capable of being used without lowering the negative electrode potential to 1.0 V (vs. Li/Li$^+$) in the negative electrode containing the active material can be made larger than that of the negative electrode containing the composite oxide represented by the general formula $Li_xNb_2TiO_7$. For this, the nonaqueous electrolyte battery using the active material according to the first embodiment can decrease the necessity of lowering the negative electrode potential to a potential at which the reductive decomposition of the electrolytic solution may be notably generated. As a result, the nonaqueous electrolyte battery can exhibit high cycle stability.

In another aspect, the active material according to the first embodiment can exhibit a capacity larger than that of the negative electrode containing the composite oxide represented by the general formula $Li_xNb_2TiO_7$ in a practical potential range for the negative electrode capable of restraining the reductive decomposition of the electrolytic solution.

In a charge and discharge reaction, the width of the plateau area at about 1.55 V can be optionally adjusted by a substitution amount z. For this, the operation potential range of the negative electrode and the charge-and-discharge characteristics of the battery can be optionally changed.

Next, the composite oxide can have a larger amount of titanium in a crystal lattice than that of the composite oxide represented by the general formula $Li_xNb_2TiO_7$, by the virtue of the fact that a part of niobium is substituted with titanium in the composite oxide represented by the general formula $Li_xNb_{2-z}Ti_{1+0.5z}M_{0.5z}O_7$. The composite oxide represented by the general formula $Li_xNb_{2-z}Ti_{1+0.5z}M_{0.5z}O_7$ can have excellent electron conductivity because of the larger amount of titanium. Since the active material according to the first embodiment containing the composite oxide represented by the general formula $Li_xNb_{2-z}Ti_{1+0.5z}M_{0.5z}O_7$ can exhibit excellent electron conductivity, the active material can exhibit improved load characteristics during charge-and-discharge. Furthermore, the active material can achieve a nonaqueous electrolyte battery capable of exhibiting excellent rapid charge-and-discharge characteristics. The change amount in the electron conductivity depends on the increased amount of the substituted hexavalent metal and titanium, i.e., the substitution amount z.

As described above, in the general formula $Li_xNb_{2-z}Ti_{1+0.5z}M_{0.5z}O_7$, the subscript x represents an amount of lithium absorbed by the composite oxide represented by the general formula. When the active material according to the first embodiment is used as a negative electrode active material, the composite oxide represented by the general formula theoretically contains no lithium in a fully discharge state. However, in fact, lithium may remain also in a discharge state in the composite oxide represented by the general formula. However, thus, the subscript x is a parameter representing the charge-and-discharge state of the composite oxide. Therefore, even when the value of the subscript x is changed in the general formula, the active material according to the first embodiment can achieve a nonaqueous electrolyte battery capable of exhibiting repeated charge-and-discharge characteristics and excellent rapid charge-and-discharge performance.

Also, in the composite oxide represented by the general formula $Li_xNb_{2-z}Ti_{1+0.5z}M_{0.5z}O_7$, the value of a subscript z is preferably within the range of $0 < z \leq 0.6$. In such a case, the capacity in the potential area of 1.2 V or more can be maximized while the decrease in the capacity caused by the substitution of Nb is minimized.

In the description above, there is described the reason why the active material according to the first embodiment containing the composite oxide represented by the general formula $Li_x(Nb_{1-y}Ta_y)_{2-z}Ti_{1+0.5z}M_{0.5z}O_7$ in which y=0, more specifically, the composite oxide containing no Ta can achieve a nonaqueous electrolyte battery capable of exhibiting excellent repeated charge-and-discharge characteristics and excellent rapid charge-and-discharge performance. However, as described above, niobium and tantalum are elements having the same chemical properties and physical properties close to each other. Therefore, the active material according to the first embodiment can unchangeably achieve a nonaqueous electrolyte battery capable of exhibiting repeated charge-and-discharge characteristics and excellent rapid charge-and-discharge performance for the same reason described above even when the value of the subscript y is changed within the range of 0 to 1 in the general formula. Preferably, the value of the subscript y is within the range of $0 \leq y \leq 0.2$.

The average particle diameter of the composite oxide contained in the active material according to the first embodiment is not particularly limited, and may be varied depending on desired battery characteristics.

Furthermore, the BET specific surface area of the composite oxide contained in the active material according to the first embodiment is not particularly limited, and preferably 0.1 m$^2$/g or more and less than 100 m$^2$/g.

When the specific surface area is 0.1 m$^2$/g or more, the contact area with the electrolytic solution can be secured. Thus, good discharge rate characteristics are easily obtained, and also, a charge time can be shortened. On the other hand, when the specific surface area is smaller than 100 m$^2$/g, reactivity with the electrolytic solution is restrained and therefore, the life characteristics can be improved. Also, the specific surface area of smaller than 100 m²/g can make coatability of a slurry containing the active material improved in the production of an electrode, which will be described later.

<Confirmation of Crystal Structure of Composite Oxide>

The crystal structure of the composite oxide contained in the active material can be confirmed by combining powder X-ray diffraction measurement (XRD: X-ray diffraction) with analysis according to the Rietveld method, for example.

The powder X-ray diffraction measurement of the active material can be performed in the following manner, for example.

First, a target sample is ground until the average particle diameter reaches about 5 μm. The average particle diameter can be found by a laser diffraction method.

The ground sample is filled in a holder part which is formed on a glass sample plate and has a depth of 0.2 mm. At this time, much care is necessary to fill the holder part fully with the sample. Special care should be taken to fill the sample just enough in order to avoid cracking and formation of voids caused.

Then, a separate glass plate is pressed to the sample filled in the folder part so as to smooth the surface of the sample. Much care should be taken to avoid too much or too little amount of the sample to be filled, thereby preventing any rises and dents in the basic plane of the holder.

Then, the glass plate filled with the sample is set to a powder X-ray diffractometer, to obtain a diffraction pattern by using Cu-Kα rays.

Also, the particle may have a high orientation depending on the particle shape of the sample. The sample having a high orientation may shift a peak position and change an intensity ratio depending on the filling manner of the sample. The sample may be measured by using a rotation sample stage in a state where a capillary is filled with the sample.

The results of the powder X-ray diffraction obtained in this manner are analyzed by the Rietveld method. In the Rietveld method, a diffraction pattern is calculated from a crystal structure model assumed in advance. Then, the diffraction pattern is fully fitted to actual values so as to improve the accuracy of parameters (lattice constant, atomic coordination, and occupation or the like) relating to the crystal structure. Therefore, the features of the crystal structure of the synthesized material can be investigated.

<Confirmation Method of Composition of Composite Oxide>

The composition of the active material can be analyzed by using inductively coupled plasma (ICP) emission spectrography, for example.

<Confirmation of Solid Solution State of Composite Oxide>

The solid solution state of the metal M in the composite oxide can be confirmed by transmission electron microscope (TEM) observation-energy dispersive X-ray (EDX) spectroscopy.

<Measuring Method of Specific Surface Area of Composite Oxide>

The specific surface area of the composite oxide contained in the active material according to the first embodiment can be measured by a method in which molecules whose adsorption occupied area is known are allowed to adsorb to the surface of powder particles at the temperature of liquid nitrogen to find the specific surface area of the sample from the amount of the adsorbed molecules. The most frequently used method is a BET method based on the low temperature and low humidity physical adsorption of an inert gas. The BET method is well known as a method for calculating the specific surface area, and is based on an extension of the Langmuir theory which is a monolayer adsorption theory to multilayer adsorption. The specific surface area determined by the BET method is called the "BET specific surface area".

<Measurement for Active Material Contained in Electrode>

When the active material contained in the electrode is subjected to the powder X-ray diffraction measurement, the ICP measurement, the TEM-XRD measurement, and the specific surface area measurement based on the BET method, the measurements may be performed in the following manner, for example.

First, in order to analyze the crystal state of the active material, the active material is put into a state in which lithium ions are perfectly released from the composite oxide. For example, when the negative electrode active material is a target to be measured, the battery is put into a fully discharged state. However, as described above, lithium ions may remain unremoved in the negative electrode active material even in a fully discharged state.

Next, the battery is disintegrated in a glove box filled with argon. The electrode is taken out, and washed with an appropriate solvent. For example, ethyl methyl carbonate or the like can be used as the appropriate solvent.

When powder X-ray diffraction measurement is performed, the electrode thus washed may be cut into a size having the same area of the holder of the powder X-ray diffractometer for use in a measurement sample. The sample is applied directly to the glass holder for measurement.

At this time, XRD is previously measured with regard to a peak corresponding to the metal of the metal foil contained in the electrode to grasp a position where a peak originated from the electrode substrate appears. XRD is previously measured by the same method to grasp peak positions of other ingredients such as a conductive aid and a binder. When the peak of the substrate material is overlapped on the peak of the active material, it is desired to separate the active material from the substrate prior to the measurement. This is to separate the overlapped peaks when measuring the peak intensity quantitatively. Of course, the procedure may be omitted if these data can be grasped in advance.

Furthermore, the impurity phases such as lithium carbonate and lithium fluoride may be mixed in the powder X-ray diffraction measurement results under the influence of the lithium ions remaining in the electrode. The mixing of the impurity phases can be prevented by setting a measurement atmosphere to an inactive gas atmosphere, or washing the surface of the electrode, for example. Even if the impurity phases are present, it is possible to analyze the results with these phases disregarded.

The electrode layer may be physically separated from the current collector in the measurement. The electrode layer is easily separated from the current collector by applying ultrasonic wave in a solvent. An electrode powder sample can be prepared from the electrode layer separated in this manner, and the sample can be subjected to various measurements.

<Production Method>

The active material according to the first embodiment can be produced by the following method, for example.

First, as raw material, an oxide or salt containing Ti, an oxide or salt containing Nb and/or an oxide or its salt containing Ta, and an oxide or salt containing a metal element M which is at least one selected from the group consisting of Mo and W are provided. The salt is preferably a salt such as a carbonate or a nitrate, which is decomposed at a relatively low temperature to form an oxide.

Next, these provided raw materials are mixed to obtain a mixture. In this case, by adjusting the mixed molar ratio of Ti, Nb, Ta, and metal element M in the mixture, the substitution amount of the metal M in the composite oxide to be finally obtained can be changed.

Next, the obtained mixture is ground and further mixed as uniformly as possible. The mixture is then sintered. The sintering is performed in a temperature range of 500 to 1250° C. for a total of 10 to 40 hours. More preferably, the sintering is performed in a temperature range of 800 to 1150° C. The crystallinity is improved by performing the sintering at 800° C. or higher. Since conventional electrode production facilities can be appropriable at 1000° C. or lower, a cost reduction can be achieved. After the sintering, a monoclinic composite oxide is obtained.

The lithium ions are absorbed into the composite oxide by incorporating the monoclinic composite oxide synthesized as described above as the negative electrode active material into the nonaqueous electrolyte battery and charging the nonaqueous electrolyte battery. As a result, the composite oxide has a composition of the general formula $Li_x(Nb_{1-y}Ta_y)_{2-z}Ti_{1+0.5z}M_{0.5z}O_7$ ($0 \leq x \leq 5$, $0 \leq y \leq 1$, and $0 < z \leq 1$, and M is at least one metal element selected from the group consisting of Mo and W).

It should be noted that a composite oxide containing lithium in advance can also be obtained by using a compound containing lithium such as lithium carbonate as the synthetic raw material.

The active material according to the first embodiment described above contains the composite oxide represented by the general formula $Li_x(Nb_{1-y}Ta_y)_{2-z}Ti_{1+0.5z}M_{0.5z}O_7$ ($0 \leq x \leq 5$, $0 \leq y \leq 1$, and $0 < z \leq 1$, and M is at least one metal element selected from the group consisting of Mo and W). For this, the active material according to the first embodiment can achieve the nonaqueous electrolyte battery capable of exhibiting excellent repeated charge-and-discharge characteristics and excellent rapid charge-and-discharge performance.

The active material according to the first embodiment can be used also in batteries using cations of alkali metals or alkali earth metals (for example, Na, K, and Mg or the like) other than the lithium ion.

Second Embodiment

According to a second embodiment, there is provided a nonaqueous electrolyte battery containing the active material according to the first embodiment. The nonaqueous electrolyte battery includes a negative electrode, a positive electrode, and a nonaqueous electrolyte. The active material according to the first embodiment can be used in the negative electrode or the positive electrode, or both the negative electrode and the positive electrode.

The nonaqueous electrolyte battery according to the second embodiment can also further include a separator provided between the positive electrode and the negative electrode. The positive electrode, the negative electrode, and the separator can constitute an electrode group. The nonaqueous electrolyte can be held by the electrode group.

The nonaqueous electrolyte battery according to the second embodiment can further include a container housing the electrode group and the nonaqueous electrolyte.

Also, the nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may extend to the outside of the container.

Hereinafter, the negative electrode, the positive electrode, the nonaqueous electrolyte, the separator, the container, the positive electrode terminal, and the negative electrode terminal for the nonaqueous electrolyte battery using the active material according to the first embodiment in the negative electrode will be described in detail.

(1) Negative Electrode

The negative electrode can include a negative electrode current collector and a negative electrode layer (negative electrode active material-containing layer). The negative electrode layer can be formed on one or both surfaces of the negative electrode current collector.

The negative electrode layer can contain a negative electrode active material, and optionally, a conductive agent and a binder.

The active material according to the first embodiment is used as the negative electrode active material. The negative electrode using the active material according to the first embodiment can provide a nonaqueous electrolyte battery capable of exhibiting a high charge-and-discharge capacity and excellent repeated charge-and-discharge performance.

As the negative electrode active material, the active material according to the first embodiment may be used alone, or may also be used as a mixture of the active material with other active materials. Examples of the other negative electrode active materials include titanium dioxide ($TiO_2$) having an anatase structure, titanium dioxide ($TiO_2$ (B)) having a monoclinic structure, lithium titanate having a ramsdelite structure (for example, $Li_2Ti_3O_7$), and lithium titanate having a spinel structure (for example, $Li_4Ti_5O_{12}$).

The conductive agent is formulated to improve the current-collecting performance and to restrain the contact resistance between the active material and the current collector. Examples of the conductive agent include carbonaceous materials such as acetylene black, carbon black, and graphite. In order to restrain the amount of the conductive aid to be added, the surfaces of particles of the active material according to the first embodiment may be covered with carbon.

The binder is formulated to fill gaps between the dispersed negative electrode active materials and also to bind the negative electrode active material with the current collector. Examples of the binder include polytetrafluoroethylene (PTFE), polyvinylidene fluoride (PVdF), a fluoro-rubber, and a styrene-butadiene rubber.

The active material, the conductive agent, and the binder in the negative electrode layer are preferably formulated in ratios of 68% by mass to 96% by mass, 2% by mass to 30% by mass, and 2% by mass to 30% by mass, respectively. When the amount of the conductive agent is 2% by mass or more, the current-collecting performance of the negative electrode layer can be improved. When the amount of the binder is 2% by mass or more, the binding strength between the negative electrode layer and the current collector is satisfactory, and excellent cycle characteristics may be expected. On the other hand, the amounts of the conductive agent and binder are respectively preferably 28% by mass or less with the view of developing a high-capacity battery.

As the negative electrode current collector, a material which is electrochemically stable at the lithium absorption and release potential of the negative electrode active material is used. The current collector is preferably made of copper, nickel, stainless or aluminum, or an aluminum alloy containing at least one element selected from Mg, Ti, Zn, Mn, Fe, Cu, and Si. The thickness of the current collector is preferably 5 to 20 µm. A current collector having such a thickness can keep the balance between the strength of the negative electrode and light-weight performance.

The negative electrode is manufactured by, for example, suspending the negative electrode active material, the binder, and the conductive agent in a usual solvent to prepare a slurry, applying this slurry to the surface of the current collector, and drying to form a negative electrode layer, which is then pressed.

Alternatively, the negative electrode can be manufactured by mixing the negative electrode active material, the binder, and the conductive agent, forming the mixture into a pellet, and placing the pellet on the current collector using the pellet as the negative electrode layer.

(2) Positive Electrode

The positive electrode can include a current collector and a positive electrode layer (positive electrode active material-containing layer). The positive electrode layer may be formed on one or both surfaces of the current collector.

The positive electrode layer can contain a positive electrode active material, and optionally, a conductive agent and a binder.

As the positive electrode active material, for example, oxides and sulfides can be used. Examples of the oxides and sulfides include manganese dioxide ($MnO_2$), iron oxide, copper oxide, and nickel oxide, each of which absorbs lithium, a lithium-manganese composite oxide (for example, $Li_xMn_2O_4$ or $Li_xMnO_2$), a lithium-nickel composite oxide (for example, $Li_xNiO_2$), a lithium-cobalt composite oxide (for example, $Li_xCoO_2$), a lithium-nickel-cobalt composite oxide (for example, $LiNi_{1-y}Co_yO_2$), a lithium-manganese-cobalt composite oxide (for example, $Li_xMn_yCo_{1-y}O_2$), a lithium-manganese-nickel composite oxide having a spinel structure ($Li_xMn_{2-y}Ni_yO_4$), a lithium-phosphorous oxide having an olivine structure (for example, $Li_xFePO_4$, $Li_xFe_{1-y}Mn_yPO_4$, and $Li_xCoPO_4$), iron sulfate ($Fe_2(SO_4)_3$), vanadium oxide (for example, $V_2O_5$), and a lithium-nickel-cobalt-manganese composite oxide. Here, $0 \le x \le 1$ and $0 \le y \le 1$. As the positive electrode active material, one of these compounds may be used alone or combination of plural compounds may be used.

Preferable examples of the active material include compounds having a high positive electrode potential such as a lithium-manganese composite oxide (for example, $Li_xMn_2O_4$), a lithium-nickel composite oxide (for example, $Li_xNiO_2$), a lithium-cobalt composite oxide (for example, $Li_xCoO_2$), a lithium-nickel-cobalt composite oxide (for example, $LiNi_{1-y}Co_yO_2$), a lithium-manganese-nickel composite oxide having a spinel structure (for example, $Li_xMn_{2-y}Ni_yO_4$), a lithium-manganese-cobalt composite oxide (for example, $Li_xMn_yCo_{1-y}O_2$), lithium-iron phosphate (for example, $Li_xFePO_4$), and a lithium-nickel-cobalt-manganese composite oxide. Here, $0<x \le 1$ and $0<y \le 1$ are set.

Among these, in the case of using a nonaqueous electrolyte containing an ordinary temperature molten salt, it is preferable to use at least one selected from lithium iron phosphate $Li_xVPO_4F$ ($0<x \le 1$), a lithium-manganese composite oxide, a lithium-nickel composite oxide, and a lithium-nickel-cobalt composite oxide from the viewpoint of cycle life. This is because reactivity between the positive electrode active material and the ordinary temperature molten salt is restrained.

The primary particle diameter of the positive electrode active material is preferably 100 nm to 1 µm. A positive electrode active material having a primary particle diameter of 100 nm or more is easily handled in industrial production. A positive electrode active material having a primary particle diameter of 1 µm or less enables lithium ions to diffuse smoothly in a solid.

The specific surface area of the positive electrode active material is preferably 0.1 $m^2$/g to 10 $m^2$/g. A positive electrode active material having a specific surface area of 0.1 $m^2$/g or more can secure lithium ion-absorption and release sites sufficiently. A positive electrode active material having a specific surface area of 10 $m^2$/g or less is easily handled in industrial production, and can ensure good charge-and-discharge cycle performance.

The binder is formulated to bind the positive electrode active material with the current collector. Examples of the binder include polytetrafluoroethylene (PTFE), polyvinylidene fluoride (PVdF), and a fluoro-rubber.

The conductive agent can be formulated in the positive electrode layer as required to improve the current-collecting ability of the active material and to reduce the contact resistance between the active material and the current collector. Examples of the conductive agent include carbonaceous materials such as acetylene black, carbon black, and graphite.

The positive electrode active material and the binder in the positive electrode layer are preferably formulated in ratios of 80% by mass to 98% by mass for the positive electrode active material and 2% by mass to 20% by mass for the binder, respectively.

When the amount of the binder is 2% by mass or more, satisfactory electrode strength is obtained. When the amount of the binder is 20% by mass or less, the amount of the insulating material of the electrode to be formulated can be reduced, leading to reduced internal resistance.

When the conductive agent is added, the positive electrode active material, the binder, and the conductive agent are preferably formulated in ratios of 77% by mass to 95% by mass, 2% by mass to 20% by mass, and 3% by mass to 15% by mass, respectively. The conductive agent can produce the aforementioned effect by formulating it in an amount of 3% by mass or more. When the amount of the conductive agent is set to 15% by mass or less, the decomposition of the nonaqueous electrolyte on the surface of the positive electrode conductive agent can be reduced even when the battery is stored at high temperatures.

The current collector is preferably made of an aluminum foil, or an aluminum alloy foil containing at least one element selected from Mg, Ti, Zn, Ni, Cr, Mn, Fe, Cu, and Si.

The thickness of the aluminum foil or aluminum alloy foil is desirably 5 µm to 20 µm, and more desirably 15 µm or less. The purity of the aluminum foil is preferably 99% by mass or more. The content of transition metals such as iron, copper, nickel, and chromium contained in the aluminum foil or the aluminum alloy foil is preferably set to 1% by mass or less.

The positive electrode is manufactured by, for example, suspending the positive electrode active material and the binder, and the conductive agent as required, in an appropriate solvent to prepare a slurry, applying this slurry to the surface of the positive electrode current collector, and drying to form a positive electrode layer, which is then pressed.

Alternatively, the positive electrode can be manufactured by mixing the positive electrode active material and the binder, and the conductive agent as required, forming the mixture into a pellet, and placing the pellet on the current collector using the pellet as the positive electrode layer.

(3) Nonaqueous Electrolyte

The nonaqueous electrolyte may be a liquid nonaqueous electrolyte, which is prepared by dissolving an electrolyte in an organic solvent, or a gel-like nonaqueous electrolyte, which is prepared by forming a composite of a liquid electrolyte and a polymer material.

The liquid nonaqueous electrolyte is preferably one obtained by dissolving an electrolyte in an organic solvent in a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium (LiN$(CF_3SO_2)_2$), and lithium bis(fluorosulfonyl)imide (FSI), and mixtures of these compounds. The electrolyte is preferably one which is scarcely oxidized even at a high potential. $LiPF_6$ is most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoethane (DEE), γ-butyrolactone (GBL), acetonitrile (AN) and sulfolan (SL). These organic solvents may be used singly or as a mixed solvent.

Examples of the polymer material include polyvinylidene fluoride (PVdF), polyacrylonitrile (PAN), and polyethylene oxide (PEO).

A ordinary temperature molten salt (ionic melt) containing lithium ions, a polymer solid electrolyte, and an inorganic solid electrolyte or the like may also be used as the nonaqueous electrolyte.

The ordinary temperature molten salt (ionic melt) means compounds which can exist in a liquid state at normal temperature (15° C. to 25° C.) among organic salts constituted of combinations of organic cations and anions. Examples of the ordinary temperature molten salt include those which solely exist in a liquid state, those which are put into a liquid state when mixed with an electrolyte, and those which are put into a liquid state when dissolved in an organic solvent. The melting point of the ordinary temperature molten salt to be usually used for the nonaqueous electrolyte battery is generally 25° C. or less. Further, the organic cation has generally a quaternary ammonium skeleton.

The polymer solid electrolyte is prepared by dissolving an electrolyte in a polymer material and solidifying the electrolyte mixture.

The inorganic solid electrolyte is a solid material having lithium ion-conductivity.

(4) Separator

The separator may be formed of, for example, a porous film containing polyethylene, polypropylene, cellulose or polyvinylidene fluoride (PVdF), or a synthetic resin nonwoven fabric. Among these, a porous film formed of polyethylene or polypropylene melts at a fixed temperature, making it possible to shut off current, and can, thereby, improve safety.

(5) Container

As a container, for example, a container made of a laminate film having a thickness of 0.5 mm or less, or a metal container having a thickness of 1 mm or less may be used. The thickness of the laminate film is more preferably 0.2 mm or less. The metal container has a thickness of, more preferably, 0.5 mm or less, and still more preferably 0.2 mm or less.

Examples of the shape of the container include a flat type (thin type), an angular type, a cylinder type, a coin type, and a button type. The container having a size depending on the dimensions of a battery may be, for example, container for a small-sized battery to be mounted on portable electronic devices or the like and container for a large-sized battery to be mounted on two- to four-wheel vehicles or the like are used.

As the laminate film, a multilayer film in which a metal layer is sandwiched between resin layers may be used. The metal layer is preferably formed of an aluminum foil or an aluminum alloy foil to reduce the weight of the battery. For example, polymer materials such as polypropylene (PP), polyethylene (PE), nylon, and polyethylene terephthalate (PET) may be used for the resin film. The laminate film can be molded into the shape of the container by sealing using thermal fusion bonding.

The metal container may be made of, for example, aluminum or an aluminum alloy or the like. The aluminum alloy is preferably an alloy containing elements such as magnesium, zinc, and silicon. When the alloy contains transition metals such as iron, copper, nickel, and chromium, the content of the transition metals is preferably 100 ppm or less.

(6) Positive Electrode Terminal and Negative Electrode Terminal

The negative electrode terminal may be made of a material which is electrochemically stable at potentials at which lithium is absorbed into and released from the negative electrode active material described above, and has conductivity. Specifically, copper, nickel, stainless steel, and aluminum are included. In order to reduce the contact resistance, the material is preferably same as the material of the negative electrode current collector.

The positive electrode terminal may be made of a material having electrical stability at the potential ranging from 3 V to 5 V relative to metallic lithium ions, and conductivity. Specific examples of the material include aluminum alloys containing elements such as Mg, Ti, Zn, Mn, Fe, Cu, and Si, and aluminum. In order to reduce the contact resistance, the material is preferably the same as the material of the positive electrode current collector.

Next, an example of the nonaqueous electrolyte battery according to the second embodiment will be more specifically described with reference to FIGS. 3 and 4.

FIG. 3 is a sectional view of the nonaqueous electrolyte battery as an example according to the second embodiment. FIG. 4 is an enlarged view of a part A of FIG. 3.

A flat type nonaqueous electrolyte battery 10 shown in FIG. 3 includes a flat-shaped coiled electrode group 1 and a bag-shaped container 2 housing the flat-shaped coiled electrode group 1. The bag-shaped container 2 is made of a laminate film in which a metal layer is sandwiched between two resin films.

The flat-shaped coiled electrode group 1 is formed by spirally coiling a laminate obtained by laminating a negative electrode 3, a separator 4, a positive electrode 5, and a separator 4 in this order from the outside and by press-molding the coiled laminate. The outermost negative electrode 3 has a structure in which a negative electrode layer 3b is formed on one inside surface of a negative electrode current collector 3a as shown in FIG. 4. Other negative electrodes 3 each have a structure in which a negative electrode layer 3b is formed on each surface of the negative electrode current collector 3a. The positive electrode 5 includes a positive electrode layer 5b formed on each surface of the positive electrode current collector 5a.

In the vicinity of the outer peripheral end of the coiled electrode group 1, a negative electrode terminal 6 is connected to the negative electrode current collector 3a of the outermost negative electrode 3, and a positive electrode terminal 7 is connected to the positive electrode current collector 5a of the inside positive electrode 5. The negative electrode terminal 6 and the positive electrode terminal 7 are externally extended from an opening part of the bag-shaped container 2. For example, a liquid nonaqueous electrolyte is injected from the opening part of the bag-shaped container 2. The coiled electrode group 1 and the liquid nonaqueous electrolyte can be completely sealed by heat-sealing the opening of the bag-shaped container 2 across the negative electrode terminal 6 and the positive electrode terminal 7.

Figure 4:
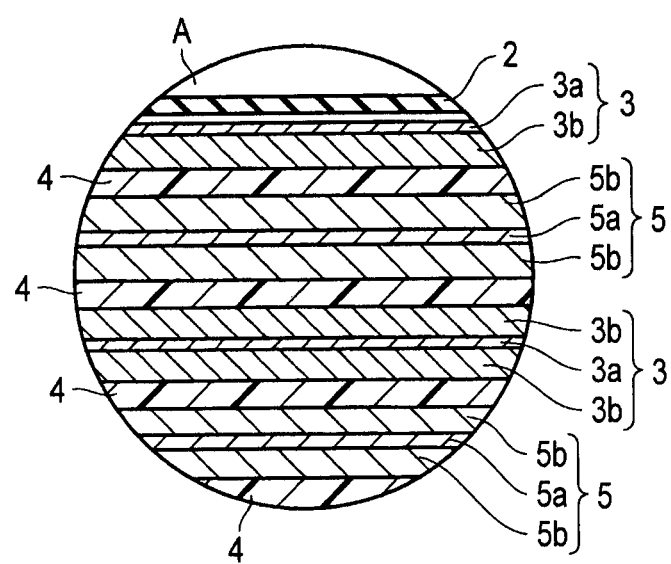
FIG. 4 is an enlarged view of a part A of FIG. 3.
Figure 5:
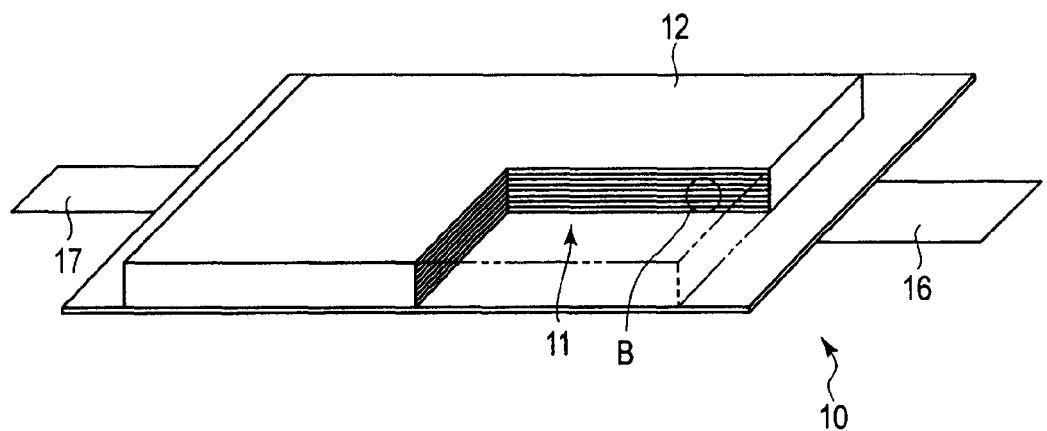
FIG. 5 is a partially broken perspective view typically representing a nonaqueous electrolyte battery as another example according to a second embodiment.
Figure 6:
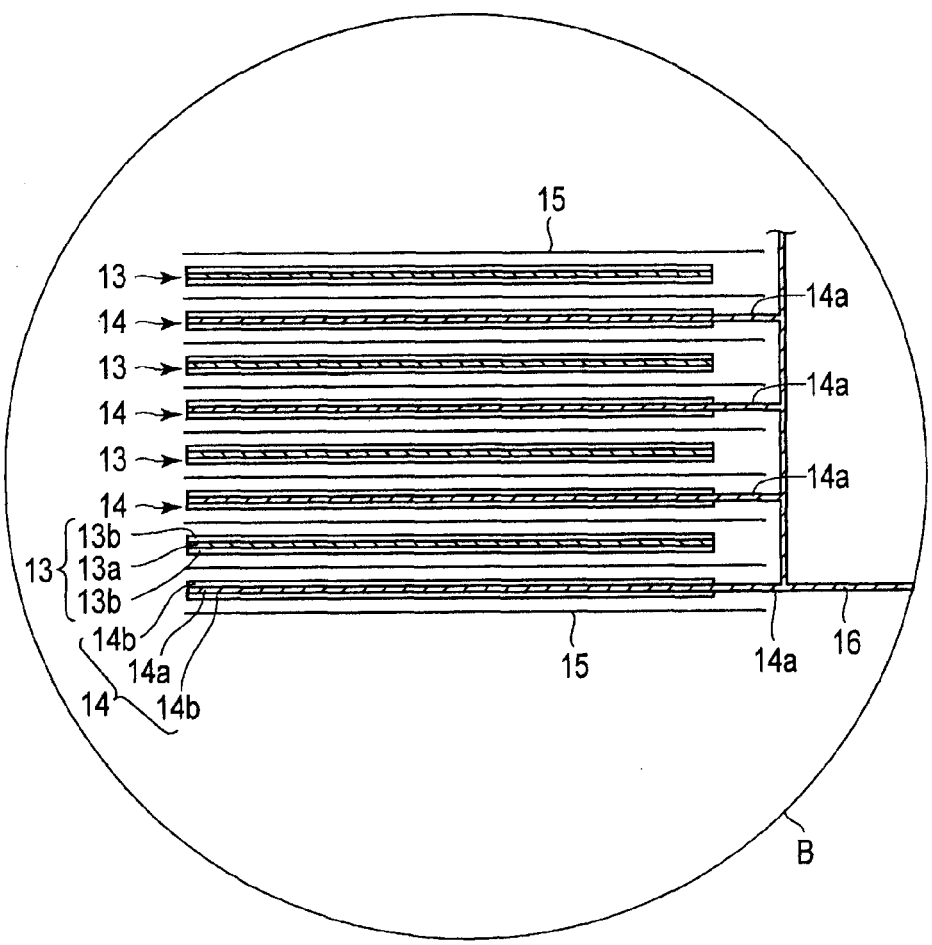
FIG. 6 is an enlarged view of a part B in FIG. 5.

The nonaqueous electrolyte battery according to the second embodiment is not limited to the battery having the structure shown in FIGS. 3 and 4, and may have a structure as shown in, for example, FIGS. 5 and 6.

FIG. 5 is a partly broken perspective view typically showing a nonaqueous electrolyte battery as another example according to the second embodiment. FIG. 6 is an enlarged sectional view of a part B in FIG. 5.

The flat type nonaqueous electrolyte battery 10 shown in FIGS. 5 and 6 includes a stacked-type electrode group 11 and a container 12 housing the stacked-type electrode group 11. The container 12 is made of a laminate film in which a metal layer is sandwiched between two resin layers.

The stacked-type electrode group 11 has a structure in which positive electrodes 13 and negative electrodes 14 are, as shown in FIG. 6, alternately laminated with a separator 15 sandwiched therebetween. The positive electrodes 13 exist in plural, each being provided with a current collector 13a and a positive electrode active material-containing layers 13b formed on both surfaces the current collector 13a. The negative electrodes 14 exist in plural, each being provided with a current collector 14a and negative electrode active material-containing layers 14b carried on both surfaces of the current collector 14a. One side of the current collector 14a of each negative electrode 14 is projected from the positive electrode 13. The projected part of the current collector 14a is electrically connected to a band-shaped negative electrode terminal 16. The end of the band-shaped negative electrode terminal 16 is externally drawn out of the container 12. Although not shown in the drawings, the side of the current collector 13a of the positive electrode 13 positioned opposite to the projected side of the current collector 14a is projected from the negative electrode 14. The part of the current collector 13a projected from the negative electrode 14 is electrically connected to a band-shaped positive electrode terminal 17. The end of the band-shaped positive electrode terminal 17 is positioned opposite to the negative electrode terminal 16, and externally drawn out of the side of the container 12.

Since the nonaqueous electrolyte battery according to the second embodiment contains the active material according to the first embodiment, the nonaqueous electrolyte battery can exhibit excellent rapid charge-and-discharge performance and excellent repeated charge-and-discharge characteristics.

Third Embodiment

According to a third embodiment, there is provided a battery pack. The battery pack includes the nonaqueous electrolyte battery according to the second embodiment.

The battery pack according to the third embodiment can also include a plurality of nonaqueous electrolyte batteries. The plurality of nonaqueous electrolyte batteries can also be electrically connected to each other in series, or can also be electrically connected to each other in parallel. Alternatively, the plurality of nonaqueous electrolyte batteries can also be connected to each other in combinations of series and parallel.

Hereinafter, an example of the battery pack according to the third embodiment will be described with reference to FIGS. 7 and 8.

FIG. 7 is an exploded perspective view of the battery pack as an example according to the third embodiment. FIG. 8 is a block diagram showing an electric circuit of the battery pack of FIG. 7.

Figure 8:
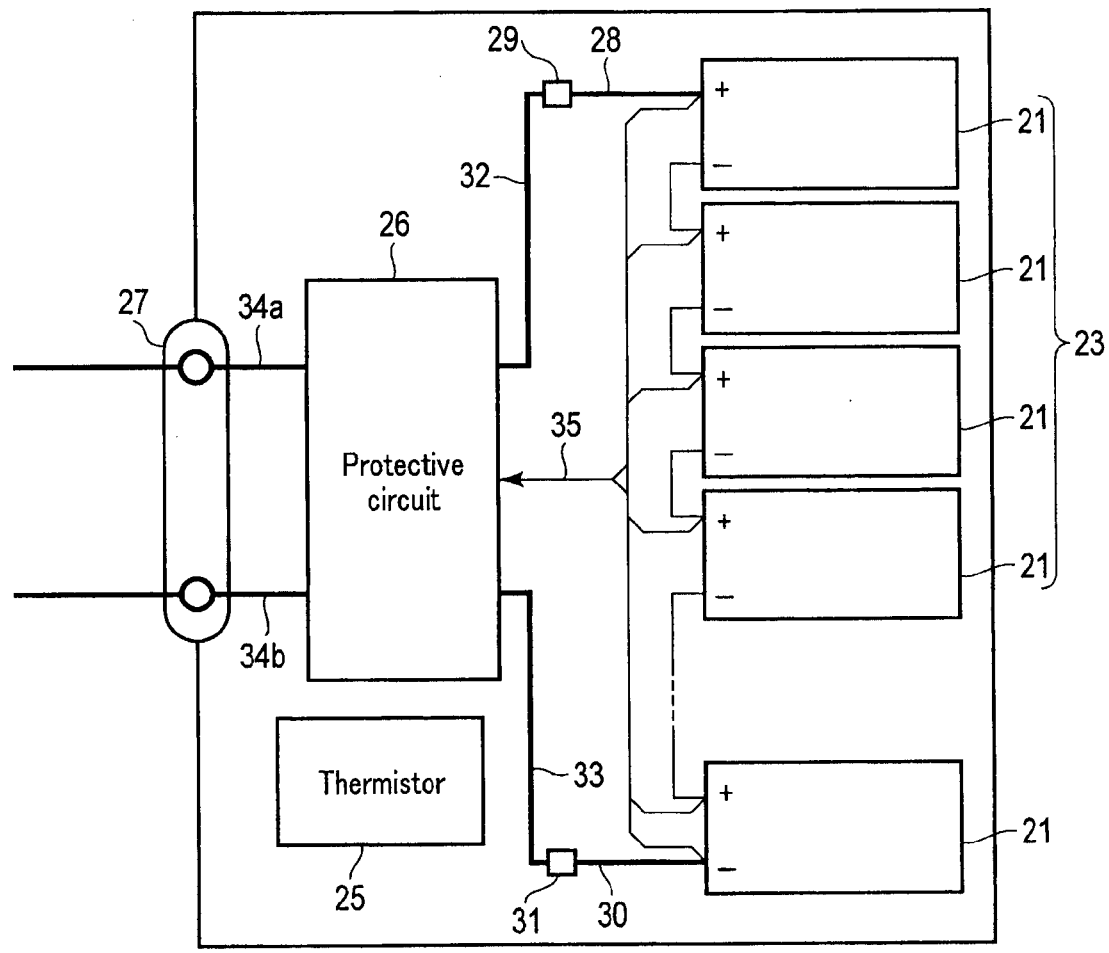
FIG. 8 is a block diagram showing an electric circuit of the battery pack of FIG. 7.

A battery pack 20 shown in FIGS. 7 and 8 includes a plurality of unit cells 21. The unit cell 21 is the flat type nonaqueous electrolyte battery as an example according to the second embodiment described with reference to FIGS. 3 and 4.

The plurality of unit cells 21 are laminated such that the negative electrode terminals 6 and positive electrode terminals 7 each of which is externally extended are arranged in the same direction and fastened with an adhesive tape 22 to thereby constitute a battery module 23. These unit cells 21 are electrically connected to each other in series as shown in FIG. 8.

A printed wiring board 24 is arranged opposite to the side surface of the unit cells 21 from each of which the negative electrode terminal 6 and the positive electrode terminal 7 are extended. As shown in FIG. 8, a thermistor 25, a protective circuit 26, and an energizing terminal 27 connected to external devices are mounted on the printed wiring board 24. Also an insulating plate (not shown) is attached to the surface of the printed wiring board 24 facing the battery module 23 to avoid unnecessary connection with the wiring of the battery module 23.

A positive electrode side lead 28 is connected to the positive electrode terminal 7 positioned on the lowermost layer of the battery module 23, and the end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23, and the end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detect the temperature of the unit cell 21, and the detected signals are transmitted to the protective circuit 26. The protective circuit 26 can shut off a plus side wiring 34a and a minus side wiring 34b between the protective circuit 26 and the energizing terminal 27 connected to external devices in a predetermined condition. The predetermined condition means, for example, the case where the temperature detected by the thermistor 25 is a predetermined temperature or higher. Also, the predetermined condition means, for example, the case of detecting overcharge, overdischarge, and over-current of the unit cell 21. The detections of this overcharge or the like are made for each of the unit cells 21 or whole battery module 23. When each of the unit cells 21 is detected, either the voltage of the battery may be detected, or the potential of the positive electrode or negative electrode may be detected. In the latter case, a lithium electrode used as a reference electrode is inserted into each unit cells 21. In the case of the battery pack 20 in FIGS. 7 and 8, a wiring 35 for detecting voltage is connected to each unit cell 21. The detected signals are transmitted to the protective circuit 26 through these wirings 35.

A protective sheet 36 made of a rubber or a resin is arranged on each of the three side surfaces of the battery module 23 excluding the side surface from which the positive electrode terminal 7 and the negative electrode terminal 6 are projected.

The battery module 23 is housed in a housing container 37 together with each of the protective sheets 36 and the printed wiring board 24. That is, the protective sheets 36 are arranged on both internal surfaces in a long side direction of the housing container 37 and on one of the internal surface at the opposite side in a short side direction. The printed wiring board 24 is arranged on the other internal surface in a short side direction. The battery module 23 is located in a space surrounded by the protective sheets 36 and the printed wiring board 24. A lid 38 is attached to the upper surface of the housing container 37.

In order to fix the battery module 23, a heat-shrinkable tape may be used in place of the adhesive tape 22. In this case, the battery module is bound by placing the protective sheets on the both sides of the battery module, winding a heat-shrinkable tape around such, and thermally shrinking the heat-shrinkable tape.

The structure in which the unit cells 21 are connected to each other in series is shown in FIGS. 7 and 8. However, these unit cells may be connected to each other in parallel to increase the capacity of the battery. Also, the assembled battery packs may be connected to each other in series and/or in parallel.

The embodiments of the battery pack according to the third embodiment are appropriately changed depending on an application. As the application of the battery pack according to the third embodiment, battery packs in which the cycle characteristics at large current are desired are preferable. Specific examples of the applications include power sources for digital cameras, and power sources mounted on vehicles such as two- to four-wheel hybrid electric cars, two- to four-wheel electric cars, and assist bicycles. The battery pack according to the third embodiment is particularly preferably used for power sources mounted on vehicles.

Since the battery pack according to the third embodiment includes the nonaqueous electrolyte battery according to the second embodiment, the battery pack can exhibit a high energy density, excellent rapid charge-and-discharge performance, and excellent repeated charge-and-discharge characteristics.

EXAMPLES

Hereinafter, the embodiments will be described more in detail based on Examples.

Synthesis

Example 1

In Example 1, an active material was synthesized in the following procedure.

First, as starting material, powders of titanium oxide $TiO_2$, niobium pentoxide $Nb_2O_5$, and molybdenum oxide $MoO_3$ which were commercially available oxide reagents were provided. These powders were weighed at a molar ratio of $TiO_2:Nb_2O_5:MoO_3=1.0:0.98:0.0099$. The weighed powders were charged into a mortar. Ethanol was added to the mortar, and the powders were wet-mixed.

Next, the mixture thus obtained was placed in an electric furnace, and calcinated for 6 hours at a temperature of 850° C. Then, the calcinated powder was taken out of the furnace, reground, and further mixed.

The mixture thus obtained was then subjected to first sintering at a temperature of 1100° C. for 12 hours. After the sintering, the sintered powder was taken out of the furnace, and the sintered powder was remixed.

The remixed sintered powder was then placed in the furnace, and subjected to second sintering at a temperature of 1100° C. for 12 hours. After the sintering, the sintered powder was taken out of the furnace, and the sintered powder was remixed.

The remixed sintering powder was then placed in the furnace, and subjected to third sintering at a temperature of 1100° C. for 12 hours.

The powder obtained after the third sintering, specifically, as a result of sintering at a temperature of 1100° C. for a total of 36 hours was a product of Example 1.

Example 2

In Example 2, a product of Example 2 was obtained in the same procedure as that of Example 1 except that the starting material powders were weighed and mixed at a molar ratio of $TiO_2:Nb_2O_5:MoO_3=1.0:0.9048:0.0476$.

Example 3

In Example 3, a product of Example 3 was obtained in the same procedure as that of Example 1 except that the starting material powders were weighed and mixed at a molar ratio of $TiO_2:Nb_2O_5:MoO_3=1.0:0.667:0.167$.

Example 4

In Example 4, a product of Example 4 was obtained in the same procedure as that of Example 1 except that the starting material powders were weighed and mixed at a molar ratio of $TiO_2:Nb_2O_5:MoO_3=1.0:0.5385:0.231$.

Example 5

In Example 5, a product of Example 5 was obtained in the same procedure as that of Example 1 except that the starting material powders were weighed and mixed at a molar ratio of $TiO_2:Nb_2O_5:MoO_3=1.0:0.4286:0.2857$.

Example 6

In Example 6, a product of Example 6 was obtained in the same procedure as that of Example 1 except that the starting material powders were weighed and mixed at a molar ratio of $TiO_2:Nb_2O_5:MoO_3=1.0:0.1898:0.0333$.

Example 7

In Example 7, a product of Example 7 was obtained in the same procedure as that of Example 1 except that a tungstic oxide $WO_3$ powder was used as a starting material powder in place of a molybdenum oxide powder, and the starting material powders were weighed and mixed at a molar ratio of $TiO_2:Nb_2O_5:WO_3=1.0:0.9048:0.0476$.

Example 8

In Example 8, a product of Example 8 was obtained in the same procedure as that of Example 1 except that a lithium carbonate $Li_2CO_3$ powder was further provided as a starting material powder, and the starting material powders were weighed and mixed at a molar ratio of $TiO_2:Nb_2O_5:MoO_3:Li_2CO_3=1.0:0.9048:0.0476:0.0476$.

Example 9

In Example 9, a product of Example 9 was obtained in the same procedure as that of Example 1 except that a tantalum pentoxide $Ta_2O_5$ powder was further provided as a starting material powder, and starting raw material powders were weighed and mixed at a molar ratio of $TiO_2:Nb_2O_5:MoO_3:Ta_2O_5=1.0:0.814:0.0476:0.09048$.

(Composition Analysis)

The compositions of the products obtained in Examples 1 to 9 were analyzed by ICP. The results are shown in the following Table 1.

More specifically, the product of Example 1 had a composition represented by $Nb_{1.98}Ti_{1.01}Mo_{0.01}O_7$ corresponding to the general formula $Li_x(Nb_{1-y}Ta_y)_{2-z}Ti_{1+0.5z}M_{0.5z}O_7$ in which x=0, y=0, z=0.02, and M=Mo. The product of Example 2 had a composition represented by $Nb_{1.9}Ti_{1.05}Mo_{0.05}O_7$ corresponding to the general formula $Li_x(Nb_{1-y}Ta_y)_{2-z}Ti_{1+0.5z}M_{0.5z}O_7$ in which x=0, y=0, z=0.1, and M=Mo. The product of Example 3 had a composition represented by $Nb_{1.6}Ti_{1.2}Mo_{0.2}O_7$ corresponding to the general formula $Li_x(Nb_{1-y}Ta_y)_{2-z}Ti_{1+0.5z}M_{0.5z}O_7$ in which x=0, y=0, z=0.4, and m=Mo. The product of Example 4 had a composition represented by $Nb_{1.4}Ti_{1.3}Mo_{0.3}O_7$ corresponding to the general formula $Li_x(Nb_{1-y}Ta_y)_{2-z}Ti_{1+0.5z}M_{0.5z}O_7$ in which x=0, y=0, z=0.6, and M=Mo. The product of Example 5 had a composition represented by $Nb_{1.2}Ti_{1.4}Mo_{0.4}O_7$ corresponding to the general formula $Li_x(Nb_{1-y}Ta_y)_{2-z}Ti_{1+0.5z}M_{0.5z}O_7$ in which x=0, y=0, z=0.8, and M=Mo. The product of Example 6 had a composition represented by $Nb_{1.0}Ti_{1.5}Mo_{0.5}O_7$ corresponding to the general formula $Li_x(Nb_{1-y}Ta_y)_{2-z}Ti_{1+0.5z}M_{0.5z}O_7$ in which x=0, y=0, z=1.0, and M=Mo. The product material of Example 7 had a composition represented by $Nb_{1.9}Ti_{1.05}W_{0.05}O_7$ corresponding to the general formula $Li_x(Nb_{1-y}Ta_y)_{2-z}Ti_{1+0.5z}M_{0.5z}O_7$ in which x=0, y=0, z=0.1, and M=W were set. The product material of Example 8 had a composition represented by $Li_{0.1}Nb_{1.9}Ti_{1.05}Mo_{0.05}O_7$ corresponding to the general formula $Li_x(Nb_{1-y}Ta_y)_{2-z}Ti_{1+0.5z}M_{0.5z}O_7$ in which x=0.1, y=0, z=0.1, and M=Mo were set. The product material of Example 9 had a composition represented by $(Nb_{0.9}Ta_{0.1})_{1.9}Ti_{1.05}Mo_{0.05}O_7$ corresponding to the general formula $Li_x(Nb_{1-y}Ta_y)_{2-z}Ti_{1+0.5z}M_{0.5z}O_7$ in which x=0, y=0.1, z=0.1, and M=Mo were set.

(Powder X-Ray Diffraction Measurement)

The products obtained in Examples 1 to 9 were measured by a powder X-ray diffraction method using Cu-Kα rays, as described above, to obtain X-ray diffraction pattern for each of the products obtained in Examples 1 to 9.

The results of the powder X-ray diffraction method were analyzed according to the Rietveld method. As a result, each of the products obtained in Examples 1 to 9 was found to be a monoclinic composite oxide having the same or similar crystal structure as the crystal structure of a monoclinic composite oxide $Nb_{1.9}Ti_{1.05}Mo_{0.05}O_7$ shown in FIGS. 1 and 2.

(TEM-EDX Measurement)

The products obtained in Examples 1 to 9 were subjected to TEM-EDX measurement, as described above. As a result, it was found that, in each of the products obtained in Examples 1 to 9, a metal element M entered into the crystal lattice of the monoclinic composite oxide $TiNb_2O_7$, to form a solid solution.

Comparative Example 1

In Comparative Example 1, a product of Comparative Example 1 was obtained in the same procedure as that of Example 1 except that the starting material powders were weighed and mixed at a molar ratio of $TiO_2:Nb_2O_5:MoO_3=1.0:0.25:0.375$.

The composition of the product obtained in Comparative Example 1 was analyzed by ICP. As a result, the product of Comparative Example 1 had a composition of $Nb_{0.8}Ti_{1.6}Mo_{0.6}O_7$, as shown in the following Table 1. The composition corresponds to the general formula $Li_x(Nb_{1-y}Ta_y)_{2-z}Ti_{1+0.5z}M_{0.5z}O_7$ in which x=0, y=0, z=1.2, and M=Mo are set.

The product obtained in Comparative Example 1 was measured by a powder X-ray diffraction method as in Example 1, to obtain an X-ray diffraction pattern for the product obtained in Comparative Example 1.

The result of the powder X-ray diffraction method was analyzed according to the Rietveld method. As a result, almost all of the X-ray peaks of the product material obtained in Comparative Example 1 coincided with those of the monoclinic composite oxide $TiNb_2O_7$. Meanwhile, a broad peak was confirmed near the background, which suggested the presence of a different crystal phase.

The product obtained in Comparative Example 1 was subjected to TEM-EDX measurement, as described above. As a result, it was confirmed that, in the product obtained in Comparative Example 1, the metal element M entered into the crystal lattice of the monoclinic composite oxide $TiNb_2O_7$, to form a solid solution, but a different crystal phase was present in a part of the grain boundary from electron ray diffraction.

Comparative Example 2

In Comparative Example 2, a monoclinic composite oxide $TiNb_2O_7$ was synthesized by using the same method as a method described in Patent Literature 2: Jpn. Pat. Appln. KOKAI Publication No. 2012-99287.

Specifically, the monoclinic composite oxide was synthesized in the following manner. A titanium oxide powder and a niobium pentoxide powder were weighed at a molar ratio of 1:1. The weighed powders were charged into a mortar. Ethanol was added to the mortar, and the powders were wet-mixed. The mixture thus obtained was placed in a platinum crucible, and sintered at the temperature of 1100° C. for 20 hours.

The product obtained in Comparative Example 2 was measured by a powder X-ray diffraction method as in Example 1, to obtain an X-ray diffraction pattern for the product obtained in Comparative Example 2.

The result of the powder X-ray diffraction method was analyzed according to the Rietveld method. As a result, the main X-ray peaks of the product obtained in Comparative Example 2 coincided with those of the monoclinic composite oxide $TiNb_2O_7$.

Comparative Example 3

In Comparative Example 3, a monoclinic composite oxide $TiNb_{1.875}Mo_{0.1}Mg_{0.025}O_7$ in which $M=(Mo_{1.0}Mg_{0.25})$, x=0, y=0.1, and b=0 were set was synthesized among the monoclinic composite oxides represented by the general formula $Li_xTiNb_{2-y}M_yO_{7\pm\delta}$ ($0 \leq x \leq 5$, $0 \leq y \leq 0.5$, $0 \leq \delta \leq 0.3$) described in Patent Literature 3: Jpn. Pat. Appln. KOKAI Publication No. 2012-199146, according to the following procedure.

As starting materials, powders of niobium pentoxide $Nb_2O_5$, titanium oxide $TiO_2$, molybdenum oxide $MoO_3$, and magnesium oxide MgO which were commercially available oxide reagents were used. These powders were weighed at a molar ratio of $Nb_2O_5:TiO_2:MoO_3:MgO=1.0:0.9375:0.1:0.025$, and mixed in a mortar.

The mixture thus obtained was subjected to calcination, regrinding, first sintering, regrinding, second sintering, regrinding, and third sintering in the same manner as in Example 1, to obtain a product of Comparative Example 3. The sintering temperatures and sintering times of the calcination and first to third sinterings were the same as those of Example 1.

The product material obtained in Comparative Example 3 was measured by a powder X-ray diffraction method in the same manner as in Example 1, to obtain an X-ray diffraction pattern for the product obtained in Comparative Example 3.

The result of the powder X-ray diffraction method was analyzed according to the Rietveld method. As a result, all of the X-ray peaks of the product obtained in Comparative Example 3 coincided with those of the monoclinic composite oxide $TiNb_2O_7$.

Electrochemical Measurement

Example 1

The particles of the product obtained in Example 1 were ground so that the average particle diameter was set to 10 μm or less, to obtain a ground product. Next, 3 g of a sample was measured and taken up from the ground product, and a pressure of 20 kgN was applied to the sample in a state where the sample was placed between two electrodes situated on top of a piston and on bottom of a cylinder, each having an electrode radius of 10 mm. Thus, a sample for volume resistivity measurement was obtained. The volume resistivity of the sample for volume resistivity measurement was measured. In the measurement, the resistance was measured with an applied voltage set to 10 V. The volume resistivity (Ω cm) of the product of Example 1 was calculated by using a measurement result, an electrode thickness, and a diameter. The result is shown in the following Table 1.

Next, acetylene black was mixed as a conductive agent in the product obtained in Example 1 in a ratio of 10 parts by mass to 100 parts by mass of the product, to obtain a mixture. Next, the mixture was dispersed in N-methyl-2-pyrrolidone (NMP), to obtain a dispersion liquid. Polyvinylidene fluoride (PVdF) was mixed as a binder in the dispersion liquid in a ratio of 10 parts by mass to 100 parts by mass of the product obtained in Example 1, to manufacture an electrode slurry. The slurry was applied to a current collector made of an aluminum foil by using a blade. The slurry was dried at 130° C. for 12 hours in vacuo, to obtain an electrode.

Using the electrode, a metal lithium foil as a counter electrode, and a nonaqueous electrolyte, an electrochemical measuring cell of Example 1 was fabricated. As the nonaqueous electrolyte, a solution in which 1 M of lithium hexafluorophosphate ($LiPF_6$) was dissolved in a mixed solvent of ethylene carbonate and diethyl carbonate (volume ratio: 1:1) was used.

The electrochemical measuring cell of Example 1 was subjected to a charge-and-discharge test at room temperature. The charge-and-discharge test was performed in a potential range from 1.0 V to 3.0 V relative to metal lithium electrode at a charge and discharge current of 0.2 C (hourly discharge rate). In this case, the 1-3 V discharge capacity of the electrochemical measuring cell of Example 1 was measured. The 1-3 V discharge capacity of the electrochemical measuring cell of Example 1 was 268 mAh/g.

Next, in order to confirm a capacity in a potential range of 1.2 V to 2.0 V as a practical potential range for the negative electrode, the electrochemical measuring cell of Example 1 was subjected to a charge-and-discharge test again at room temperature. The charge-and-discharge test was performed in a potential range from 1.2 V to 2.0 V relative to metal lithium electrode at a charge and discharge current of 0.2 C (hourly discharge rate). In this case, the 1.2-2 V discharge capacity of the electrochemical measuring cell of Example 1 was measured. The 1.2-2 V discharge capacity of the electrochemical measuring cell of Example 1 was 231 mAh/g.

Next, in order to confirm that the product obtained in Example 1 can be stably charged and discharged, the charge-and-discharge operations were repeated 100 cycles for the electrochemical measuring cell of Example 1. One charging and one discharging made one cycle. The charge-and-discharge operations were performed in a potential range from 1.2 V to 3.0 V relative to a metal lithium electrode at a current of 1 C (hourly discharge rate) at room temperature.

In order to confirm a discharge capacity retention ratio after 100 cycles, a charge-and-discharge operation was performed again for the electrochemical measuring cell of Example 1 at a current of 0.2 C (hourly discharge rate) to calculate the capacity retention ratio when the initial discharge capacity was defined as 100%.

Examples 2 to 9 and Comparative Examples 1 to 3

The volume resistivities of the products obtained in Examples 2 to 9 and Comparative Examples 1 to 3 were measured as in the product obtained in Example 1. The results are shown in the following Table 1.

Also, as in the product obtained in Example 1, the electrochemical measuring cells of Examples 2 to 9 and the electrochemical measuring cells of Comparative examples 1 to 3 were fabricated using the products obtained in Examples 2 to 9 and the products obtained in Comparative Examples 1 to 3. The same measurement as the electrochemical measurement performed for the electrochemical measuring cell of Example 1 was performed for the electrochemical measuring cells of Examples 2 to 9 and the electrochemical measuring cells of Comparative Examples 1 to 3. These results are shown in the following Table 1.

TABLE 1

Figure 9:
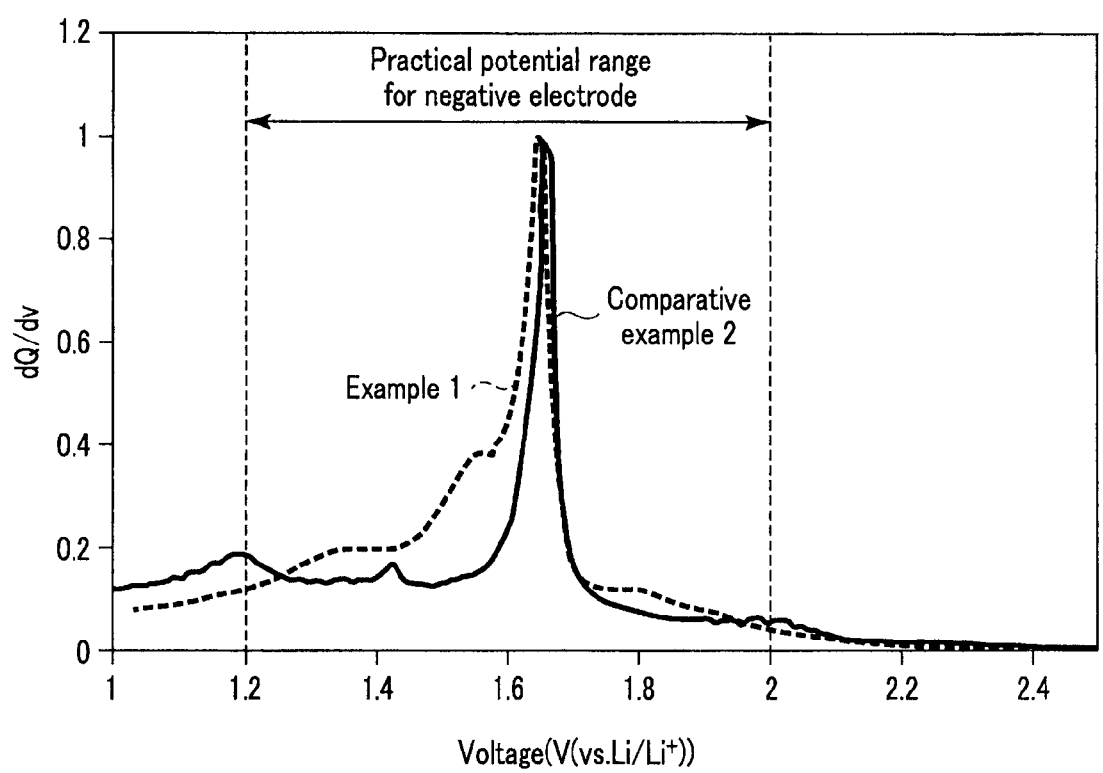
FIG. 9 is a dQ/dV plot obtained from discharge curves of Example 1 and Comparative Example 2.

| | Composition | Volume Resistivity $\Omega \cdot cm$ | 1-3 V Discharge Capacity (mAh/g) | 1.2-2 V Discharge Capacity (mAh/g) | Capacity Retention after 100 cycle |
|---|---|---|---|---|---|
| Example 1 | $Nb_{1.98}Ti_{1.01}Mo_{0.01}O_7$ (x = 0, y = 0, z = 0.02) | $6.8 \times 10^6$ | 268 | 231 | 92% |
| Example 2 | $Nb_{1.9}Ti_{1.05}Mo_{0.05}O_7$ (x = 0, y = 0, z = 0.1) | $5.8 \times 10^6$ | 265 | 238 | 95% |
| Example 3 | $Nb_{1.6}Ti_{1.2}Mo_{0.2}O_7$ (x = 0, y = 0, z = 0.4) | $6.3 \times 10^6$ | 262 | 240 | 93% |
| Example 4 | $Nb_{1.4}Ti_{1.3}Mo_{0.3}O_7$ (x = 0, y = 0, z = 0.6) | $6.2 \times 10^6$ | 258 | 243 | 96% |
| Example 5 | $Nb_{1.2}Ti_{1.4}Mo_{0.4}O_7$ (x = 0, y = 0, z = 0.8) | $5.2 \times 10^7$ | 250 | 239 | 89% |
| Example 6 | $Nb_{1.0}Ti_{1.5}Mo_{0.5}O_7$ (x = 0, y = 0, z = 1.0) | $5.5 \times 10^7$ | 248 | 228 | 88% |
| Example 7 | $Nb_{1.9}Ti_{1.05}W_{0.05}O_7$ (x = 0, y = 0, z = 0.1) | $8.2 \times 10^6$ | 260 | 232 | 93% |
| Example 8 | $Li_{0.1}Nb_{1.9}Ti_{1.05}Mo_{0.05}O_7$ (x = 0.1, y = 0, z = 0.1) | $1.2 \times 10^6$ | 267 | 231 | 95% |
| Example 9 | $(Nb_{0.9}Ta_{0.1})_{1.9}Ti_{1.05}Mo_{0.05}O_7$ (x = 0, y = 0.1, z = 0.1) | $6.0 \times 10^6$ | 264 | 237 | 96% |
| Comparative Example 1 | $Nb_{0.8}Ti_{1.6}Mo_{0.6}O_7$ (x = 0, y = 0, z = 1.2) | $6.5 \times 10^6$ | 235 | 205 | 81% |
| Comparative Example 2 | $Nb_2TiO_7$ | $5.6 \times 10^8$ | 272 | 212 | 74% |
| Comparative Example 3 | $TiNb_{1.875}Mo_{0.1}Mg_{0.025}O_7$ | $2.3 \times 10^8$ | 276 | 213 | 79% | dQ/dV plots in the initial charge-and-discharge curves obtained for the electrochemical measuring cells of Example 1 and Comparative Example 2 are shown in FIG. 9. The plots are obtained by plotting charge and discharge reaction amounts in electrode potentials, i.e., quantities of electricity provided for charge and discharge.

(Results)

The results shown in Table 1 show that the electrochemical measuring cells using the products of Examples 1 to 9 can exhibit a capacity retention ratio more excellent than that of the electrochemical measuring cell using the product material of Comparative Example 1. This is considered to be because a target single phase is maintained while electron conductivity is improved in Examples 1 to 9, which enables stable charge-and-discharge operations. On the other hand, Comparative Example 1 suggests the presence of a different crystal phase, and thereby, the capacity retention ratio is considered to be low.

Furthermore, the electrochemical measuring cells using the products of Examples 1 to 9 had both a discharge capacity in a potential range of 1.0 V to 3.0 V (vs. Li/Li$^+$) and a discharge capacity in a potential range of 1.2 V to 2.0 V (vs. Li/Li$^+$) more excellent than those of the electrochemical measuring cell using the product of Comparative Example 1. This is similarly considered to be based on both the improvement in the electron conductivity and the generation of the single phase.

Also, the results shown in Table 1 show that the electrochemical measuring cells using the products of Examples 1 to 9 can exhibit a capacity retention ratio more excellent than that of the electrochemical measuring cell using the product of Comparative Example 2. As shown in Table 1, the electrochemical measuring cells using the products of Examples 1 to 9 had a volume resistivity remarkably lower than that of the electrochemical measuring cell using the product of Comparative Example 2. This means that the products of Examples 1 to 9 have electron conductivity more excellent than that of the product of Comparative Example 2. The electron conductivities of the product materials of Examples 1 to 9 more excellent than that of the product material of Comparative Example 2 are considered to contribute to the exhibition of the excellent capacity retention ratio.

Also, as shown in Table 1, the electrochemical measuring cells using the products of Examples 1 to 9 had a discharge capacity in a potential range of 1.2 V to 2.0 V (vs. Li/Li$^+$) as an effective potential range of the negative electrode larger than that of the electrochemical measuring cell using the product of Comparative Example 2. The reason will be described below.

First, in the plots for the electrochemical measuring cell of Example 1 shown in FIG. 9, a peak at about 1.55 V (vs. Li/Li$^+$) is larger than that of Comparative Example 2. From this, the electrochemical measuring cell of Example 1 is found to have a quantity of electricity capable of being discharged at about 1.55 V (vs. Li/Li$^+$) larger than that of Comparative Example 2. This means that a plateau area at about 1.55 V (vs. Li/Li$^+$) caused by the oxidation-reduction reaction of titanium in the discharge curve of the electrochemical measuring cell of Example 1 is larger than that of the discharge curve of Comparative Example 2.

Furthermore, the plateau area at about 1.55 V (vs. Li/Li$^+$) in the discharge curves for the electrochemical measuring cells of Examples 2 to 9 was larger than that of Comparative Example 2 as in Example 1.

Because of this, the discharge capacities in the potential range of 1.2 V to 2.0 V (vs. Li/Li$^+$) for the electrochemical measuring cells of Examples 1 to 9 were larger than that of Comparative Example 2.

In addition, the results shown in Table 1 show that the electrochemical measuring cells using the products of Examples 1 to 9 can exhibit a capacity retention ratio more excellent than that of the electrochemical measuring cell using the product of Comparative Example 3. As shown in Table 1, the electrochemical measuring cells using the products of Examples 1 to 9 had a volume resistivity remarkably lower than that of the electrochemical measuring cell using the product of Comparative Example 3. This means that the product materials of Examples 1 to 9 have electron conductivity more excellent than that of Comparative Example 3. The electron conductivities of the products of Examples 1 to 9 more excellent than that of the product of Comparative Example 3 are considered to contribute to the exhibition of the excellent capacity retention ratio.

Also, as shown in Table 1, the electrochemical measuring cells using the products of Examples 1 to 9 had a discharge capacity in a potential range of 1.2 V to 2.0 V (vs. Li/Li$^+$) as an effective potential range of the negative electrode larger than that of the electrochemical measuring cell using the product of Comparative Example 2. This is considered to be because the plateau area at about 1.55 V is enlarged by substituting a part of Nb with tetravalent Ti and an M element.

Furthermore, the results of Table 1 showed that the electrochemical measuring cells of Examples 1 to 4 and Examples 7 and 8 had a capacity retention ratio more excellent than those of the electrochemical measuring cells of Comparative Examples 5 and 6. Examples 1 to 4 and Examples 7 to 8 satisfying 0<z≤0.6 showed that the effect caused by tetravalent Ti substitution could be obtained while the influence of the capacity degradation caused by Nb substitution was minimized.

More specifically, according to at least one embodiment and Example described above, there is provided the active material containing the composite oxide represented by the general formula $Li_x(Nb_{1-y}Ta_y)_{2-z}Ti_{1+0.5z}M_{0.5z}O_7$. The active material can provide a high capacity in the effective electrode potential range, and can exhibit excellent electron conductivity. For this, the active material can achieve the nonaqueous electrolyte battery capable of exhibiting excellent rapid charge-and-discharge performance and excellent repeated charge-and-discharge characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a composite oxide of formula:

$$Li_x(Nb_{1-y}Ta_y)_{2-z}Ti_{1+0.5z}M_{0.5z}O_7,$$

wherein 0≤x≤5, 0≤y≤1, and 0.4≤z≤1, and M is at least one metal element selected from the group consisting of Mo and W.

2. The active material according to claim 1, wherein a specific surface area of the composite oxide is from 0.1 to 100 m$^2$/g.

3. A nonaqueous electrolyte battery comprising:
   a negative electrode comprising the active material according to claim 1;
   a positive electrode; and
   a nonaqueous electrolyte.

4. A battery pack comprising at least one nonaqueous electrolyte battery,
   wherein the at least one nonaqueous electrolyte battery comprises a negative electrode comprising the active material according to claim 1, a positive electrode and a nonaqueous electrolyte.

5. The battery pack according to claim 4, comprising a plurality of nonaqueous electrolyte batteries,
   wherein each of the plurality of nonaqueous electrolyte batteries comprises a negative electrode comprising the active material according to claim 1, a positive electrode and a nonaqueous electrolyte.

6. The battery pack according to claim 5, wherein the plurality of the nonaqueous electrolyte batteries are electrically connected to each other in series.

7. The battery pack according to claim 5, wherein the plurality of the nonaqueous electrolyte batteries are electrically connected to each other in parallel.

8. The battery pack according to claim 5, wherein the plurality of the nonaqueous electrolyte batteries are electrically connected to each other in a combination of in series and in parallel.

9. The battery pack according to claim 5, wherein the plurality of the nonaqueous electrolyte batteries are electrically connected to each other in series, in parallel or in a combination thereof.

10. The battery pack according to claim 4, further comprising:
    a protective circuit configured to detect a voltage of the nonaqueous electrolyte battery.

11. The battery pack according to claim 1, wherein x is 0, y is 0 and z is 0.4.

* * * * *